Patented Mar. 9, 1943

2,313,039

UNITED STATES PATENT OFFICE 2,313,039

ADHESIVE COMPOSITION AND METHOD OF MAKING THE SAME

Roland D. Earle, Cohasset, Mass., assignor to Union-Baystate Co. Inc., Cambridge, Mass., a corporation of Massachusetts No Drawing. Application June 13, 1940,
Serial No. 340,367

2 Claims. (Cl. 260—32)

This invention relates to the manufacture of liquid adhesive compositions prepared from synthetic rubber-like material and particularly from polymerized chloroprene (chloro-2-butadiene-1,3) known commercially as neoprene.

Liquid adhesives of this type are made by dissolving neoprene in a suitable solvent, but before the neoprene can be dissolved in the solvent to form a colloidal liquid, it is necessary that it (the neoprene) be plasticized, an operation which causes a partial depolymerization of the polymerized chloroprene.

One method heretofore employed for plasticizing neoprene so as to render it soluble in a solvent to produce a relatively stable solution is to mill plasticizing chemicals into the neoprene on a rubber mill or in a Banbury mixer. The plasticizing ingredients thus employed have been nonvolatile alkaline materials such as amines or similar chemicals that is, alkaline materials that are nonvolatile at normal room temperatures, some typical chemical plasticizers for neoprene being hexamethylene-ammonium-hexamethylene-dithiocarbamate, known as Latac; di-O-tolylguanidine, known commercially as D. O. T. G., and diphenylguanidine, known commercially as D. P. G.

While adhesive solutions made by dissolving in a suitable solvent such as tri-chlor-ethylene, carbon tetrachloride, coal tar naphthas, etc., neoprene which has been plasticized with any of the above chemical plasticizers, are quite stable, yet when used for cementing two surfaces together, the bonding film which is deposited on the surfaces to be united will remain soft and weak and will not "cure" at normal room temperature to produce a strong tough bond. By the term "cure," I refer to a toughening of the bonding film by repolymerization, thereby to develop in the film a more highly polymerized condition.

The lack of curing action above referred to is due to the fact that the plasticizing ingredient, being nonvolatile at normal room temperature, remains in the film after it is spread on the surface and thus inhibits repolymerization thereof and maintains the film in a relatively soft condition, it being understood that the volatile solvent for the neoprene will evaporate readily at room temperature after the film has been spread on said surface.

In order to secure a proper curing of the film to make a strong bond, it has been customary to add curing agents, such as accelerators of repolymerization, to the liquid adhesive and/or to subject the film to high temperature. These methods of curing the cement are necessary to overcome the plasticizing effect in the cement of the nonvolatile plasticizing ingredient which remains in the cement because of its nonvolatile character.

My present invention is based on the discovery that unplasticized neoprene may be plasticized sufficiently so that it will dissolve in a solvent therefor while being churned or agitated in said solvent in the presence of a volatile chemical plasticizer, that is, a plasticizer that will evaporate readily at room temperature this operation preferably being carried out in a closed container to prevent loss of the volatile plasticizer by evaporation. During the churning operation, the volatile plasticizer performs its function of plasticizing or depolymerizing the neoprene sufficiently so that it will gradually become dissolved in the solvent, thereby producing a colloidal liquid adhesive.

When an adhesive made in this way is spread on any surface to form an adhesive film the volatile plasticizers as well as the volatile solvent will in a short time evaporate from the film at room temperature, and the desired repolymerization of the film to produce a strong bond will take place normally and without any necessity of using accelerators or high temperature for this purpose. The bonding film resulting from the application of my improved cement to any surface will, because of the evaporation of both the plasticizer and the solvent at room temperature, pick up strength through natural uninhibited repolymerization, which is the natural tendency of neoprene unless inhibited by chemicals remaining in the film.

While a bonding film of my improved cement which has been applied to any surface is a self-repolymerizing film at room temperature, yet if it is desired to hurry up the curing or repolymerizing operation, it would be possible to add some accelerators of repolymerization to the liquid adhesive. Such accelerators would be very effective in reducing the curing time at room temperature because the evaporation of the volatile plasticizer from the cement leaves no plasticizer in the film which has to be overcome or overpowered, so to speak, by the accelerator.

Since both the plasticizer and the solvent are volatile to the extent that they evaporate rapidly at room temperature, it is desirable, if the cement is to be stored or kept for future use, that it should be placed in a closed container, and when so preserved, it constitutes a stable solution.

While different volatile plasticizers may be used in practicing my invention, I have obtained good results by using a volatile amine, known commercially as morpholine, and having the following chemical formula:

$$NH(C_2H_4)_2O$$

A liquid adhesive solution embodying this invention may be made by dissolving unplasticized neoprene in a solvent therefor to which has been added a small amount of volatile plasticizer. The following proportions have been found to produce excellent results:

| | | |
|---|---|---|
| Unplasticized neoprene | lbs | 1½ |
| Solvent | gal | 1 |
| Volatile plasticizer by weight | oz | 1/32 |

The volatile plasticizer may be added to the solvent and mixed therein, and then the required amount of unplasticized neoprene may be placed in the solution in a closed container. The operation of plasticizing and dissolving the neoprene will be greatly facilitated by churning the neoprene in the solution. While any nonplasticized neoprene may be used, I have obtained good results from the use of neoprene known as "Neoprene type G. N.," as this comes commercially in an unplasticized condition. Other known nonplasticized synthetic rubberlike materials such as the material sold under the trade names Thiokol or Perbunan may be used in carrying out my invention, the essential feature of which consists in dissolving nonplasticized synthetic rubber-like material in a solvent therefor containing a small quantity of a volatile plasticizer, thereby securing a liquid synthetic rubber-like material adhesive which will deposite a film that will repolymerize readily at room temperature and without the necessity of using accelerators or subjecting the film to high temperature to effect a proper curing or repolymerizing operation.

The invention is not limited to the use of any particular solvent for the unplasticized neoprene, but I have successfully used toluol for this purpose. The invention might be practiced, however, by employing carbon tetrachloride or trichlor-ethylene or other solvents for neoprene.

While a cement made according to the above formula is suitable for general use, yet if it is desired to produce a thicker or more viscous cement, this can be accomplished by reducing the proportionate amount of solvent or increasing the proportionate amount of neoprene for any given batch of cement. On the other hand, if a thinner cement is desired, this result can be achieved by increasing the proportionate amount of solvent or decreasing the proportionate amount of neoprene.

Furthermore, the amount of volatile plasticizing ingredient used in making my improved cement may be varied within limits without departing from the invention, the essential thing being that such an amount of volatile plasticizer should be used as is sufficient to depolymerize the unplasticized neoprene to the point where it will dissolve in the solvent; and while a satisfactory cement has been made by using the proportions set forth in the above formula, yet it is within the invention to vary the proportion of volatile plasticizing ingredient used more or less dependent somewhat on the character of the unplasticized synthetic rubber-like material which is being used for making the cement, and somewhat on the particular plasticizer employed. The important thing, as stated above, is to use a sufficient amount of the volatile plasticizer to secure a depolymerization of the synthetic rubber-like material to the point where it will become dissolved in the solvent.

It will, therefore, be understood that the formula given above is merely a typical formula and that the proportions of any or all of the ingredients can be varied somewhat, dependent upon the character of the cement which it is desired to produce and upon the character both of the synthetic rubber-like material used in making the cement and the character of the volatile plasticizing ingredient.

If desired, any compounding ingredients may be mixed with the cement in any usual way in order to give it some special color or some other special characteristic.

I claim:

1. The method of preparing a liquid adhesive which comprises dissolving unplasticized neoprene in toluol to which has been added a small quantity of morpholine.

2. The method of preparing a liquid adhesive which comprises subjecting unplasticized neoprene to a churning action in a bath of toluol which contains a small quantity of morpholine, whereby the morpholine has a sufficient plasticizing effect on the unplasticized neoprene to reduce it to a condition in which the toluol becomes a solvent therefor, and continuing such churning action until the neoprene has become completely dissolved.

ROLAND D. EARLE.